(12) United States Patent
Katayama et al.

(10) Patent No.: US 6,981,577 B2
(45) Date of Patent: Jan. 3, 2006

(54) CONTROLLING DAMPING FORCE SHOCK ABSORBER

(75) Inventors: Yohei Katayama, Kanagawa-ken (JP); Hiroyuki Matsumoto, Kanagawa-ken (JP); Kenichi Nakamura, Kanagawa-ken (JP); Masaaki Uchiyama, Tokyo (JP)

(73) Assignee: Kabushiki Kaisha Hitachi Seisakusho, Tokyo (JP)

( * ) Notice: Subject to any disclaimer, the term of this patent is extended or adjusted under 35 U.S.C. 154(b) by 0 days.

(21) Appl. No.: 10/786,115

(22) Filed: Feb. 26, 2004

(65) Prior Publication Data
US 2004/0188200 A1 Sep. 30, 2004

(30) Foreign Application Priority Data
Mar. 31, 2003 (JP) .............................. 2003-096480

(51) Int. Cl.
*F16F 9/53* (2006.01)
(52) U.S. Cl. .............................. 188/267.2; 188/267.1; 267/140.14; 267/140.15
(58) Field of Classification Search ................ 188/370, 188/267.1, 267.2, 266, 322.15; 267/140.14, 267/140.15; 251/129.01, 129.06; 137/909
See application file for complete search history.

(56) References Cited
U.S. PATENT DOCUMENTS

| | | | |
|---|---|---|---|
| 6,095,486 A | 8/2000 | Ivers et al. | |
| 6,260,675 B1 * | 7/2001 | Muhlenkamp | 188/267 |
| 6,279,702 B1 * | 8/2001 | Koh | 188/267.2 |
| 6,311,810 B1 * | 11/2001 | Hopkins et al. | 188/267.2 |
| 6,336,535 B1 * | 1/2002 | Lisenker | 188/267.2 |
| 6,352,144 B1 * | 3/2002 | Brooks | 188/267.2 |
| 6,419,058 B1 * | 7/2002 | Oliver et al. | 188/267.2 |
| 6,612,409 B2 * | 9/2003 | Lun et al. | 188/267.2 |
| 6,637,557 B2 * | 10/2003 | Oliver et al. | 188/267.2 |
| 6,655,511 B1 * | 12/2003 | Lun et al. | 188/267 |

* cited by examiner

*Primary Examiner*—Thomas Williams
*Assistant Examiner*—Mariano Sy
(74) *Attorney, Agent, or Firm*—Wenderoth, Lind & Ponack, L.L.P.

(57) ABSTRACT

In a controllable damping force shock absorber, a piston member connected to a piston rod is disposed in a cylinder in which a magnetic fluid is contained. A disc valve having an extension-stroke pressure-receiving portion and a compression-stroke pressure-receiving portion is provided in the piston member, and a pilot chamber is formed on a rear side of the disc valve. A coil is provided adjacent to passages communicated with the pilot chamber. By energizing the coil, a magnetic field that acts on the magnetic fluid flowing through the passages is generated, changing the viscosity of the magnetic fluid to control a damping force. A valve-opening pressure of the disc valve is controlled according to the pressure in the pilot chamber, such a way that the magnetic fluid exposed to the magnetic field can flow at a low flow rate, thus achieving low power consumption.

9 Claims, 6 Drawing Sheets

CONTROLLING DAMPING FORCE SHOCK ABSORBER

BACKGROUND OF THE INVENTION

The present invention relates to a controllable damping force shock absorber utilizing a fluid having viscosity varied due to the action of a magnetic field or an electric field.

In general, in a controllable damping force shock absorber mounted on a suspension apparatus of a vehicle, such as an automobile, a piston connected to a piston rod is slidably fitted into a cylinder in which a hydraulic fluid is sealably contained, and a damping force-controlling valve is provided in a passage through which the hydraulic fluid flows according to slidable movement of the piston. The damping force-controlling valve is operated by means of an actuator, such as a proportional solenoid, a stepping motor, etc., to thereby change a flow path area for the hydraulic fluid, thus controlling a damping force.

In a conventional controllable damping force shock absorber of the above-mentioned type, problems arise such as slow response of an actuator relative to a control current, lowering of performance due to wear of a damping force-controlling valve and inconsistent performance due to complexity of a structure.

Therefore, various proposals have been made with regard to a controllable damping force shock absorber which utilizes a magnetic fluid with viscosity varied due to the action of a magnetic field, instead of a hydraulic fluid. In such a shock absorber, a coil, instead of a damping force-controlling valve, is provided in a flow passage through which a magnetic fluid flows. The magnetic fluid is exposed to a magnetic field generated by the coil, thereby changing the viscosity of the magnetic fluid and thus controlling a damping force. An example of such a controllable damping force shock absorber is disclosed in U.S. Pat. No. 6,095,486.

With this arrangement, when a current applied to the coil is reduced, the magnetic field strength acting on the magnetic fluid in the flow passage lowers, thus lowering the viscosity of the magnetic fluid and decreasing a damping force. On the other hand, when a current applied to the coil is increased, the magnetic field strength increases, thus increasing the viscosity of the magnetic fluid and increasing a damping force.

Such a controllable damping force shock absorber utilizing a magnetic fluid has a simple structure. Further, a damping force is controlled by controlling the magnetic fluid itself, i.e., changing the viscosity thereof, so that rapid response to a controlled current can be achieved. In addition, lowering of performance due to mechanical causes, such as wear, is unlikely to occur.

However, in the above-mentioned conventional controllable damping force shock absorber utilizing a magnetic fluid, the following problem arises. To provide soft damping with a sufficiently small damping force, the magnetic fluid is required to be flowed at a high flow rate. To generate a sufficiently large damping force relative to the magnetic fluid flowing at a high flow rate, a high current must be applied to the coil, and a capacity of the coil is required to be large. This results in high power consumption and an increase in the size of the coil.

The same principle of operation can be applied to a controllable damping force shock absorber which utilizes an electrorheological fluid and electrodes, instead of a magnetic fluid and a coil. Such a shock absorber has the same problem as described above.

SUMMARY OF THE INVENTION

In view of the above situation, the present invention has been made. It is an object of the present invention to provide a controllable damping force shock absorber, utilizing a variable viscosity fluid, which can be operated with low power consumption and which achieves a reduction in size of a coil or electrodes.

The present invention provides a controllable damping force shock absorber comprising a cylinder, a piston slidably disposed in the cylinder in a fitted relationship and a piston rod having one end connected to the piston. The other end of the piston rod is extended to the outside of the cylinder. A variable viscosity fluid is sealably contained in the cylinder, and a damping force-controlling mechanism controls a damping force by controlling a flow of the variable viscosity fluid caused by slidable movement of the piston. The damping force-controlling mechanism includes a damping valve having a pressure-receiving portion for receiving a pressure of the variable viscosity fluid in at least one of an extension stroke and a compression stroke of the piston rod. A pilot chamber is provided behind the pressure-receiving portion, and a pressure in the pilot chamber is applied in a direction for closing the damping valve, to thereby control the damping valve. A pilot passage is formed so as to allow the variable viscosity fluid to flow through the pilot chamber according to slidable movement of the piston. Viscosity-changing means is provided to change viscosity of the variable viscosity fluid flowing through the pilot passage.

With this arrangement, in an extension or compression stroke of the piston rod, a damping force is generated by means of the damping valve and the pilot passage. By operating the viscosity-changing means to thereby generate an energy field, the viscosity of the variable viscosity fluid flowing through the pilot passage changes due to the action of the energy field, thus changing the flow resistance of the pilot passage. Therefore, the pressure in the pilot chamber changes according to the strength of the energy field, to thereby control a valve-opening pressure of the damping valve.

DETAILED DESCRIPTION OF THE INVENTION

Hereinbelow, embodiments of the present invention are described in detail, referring to the accompanying drawings.

Figure 1:
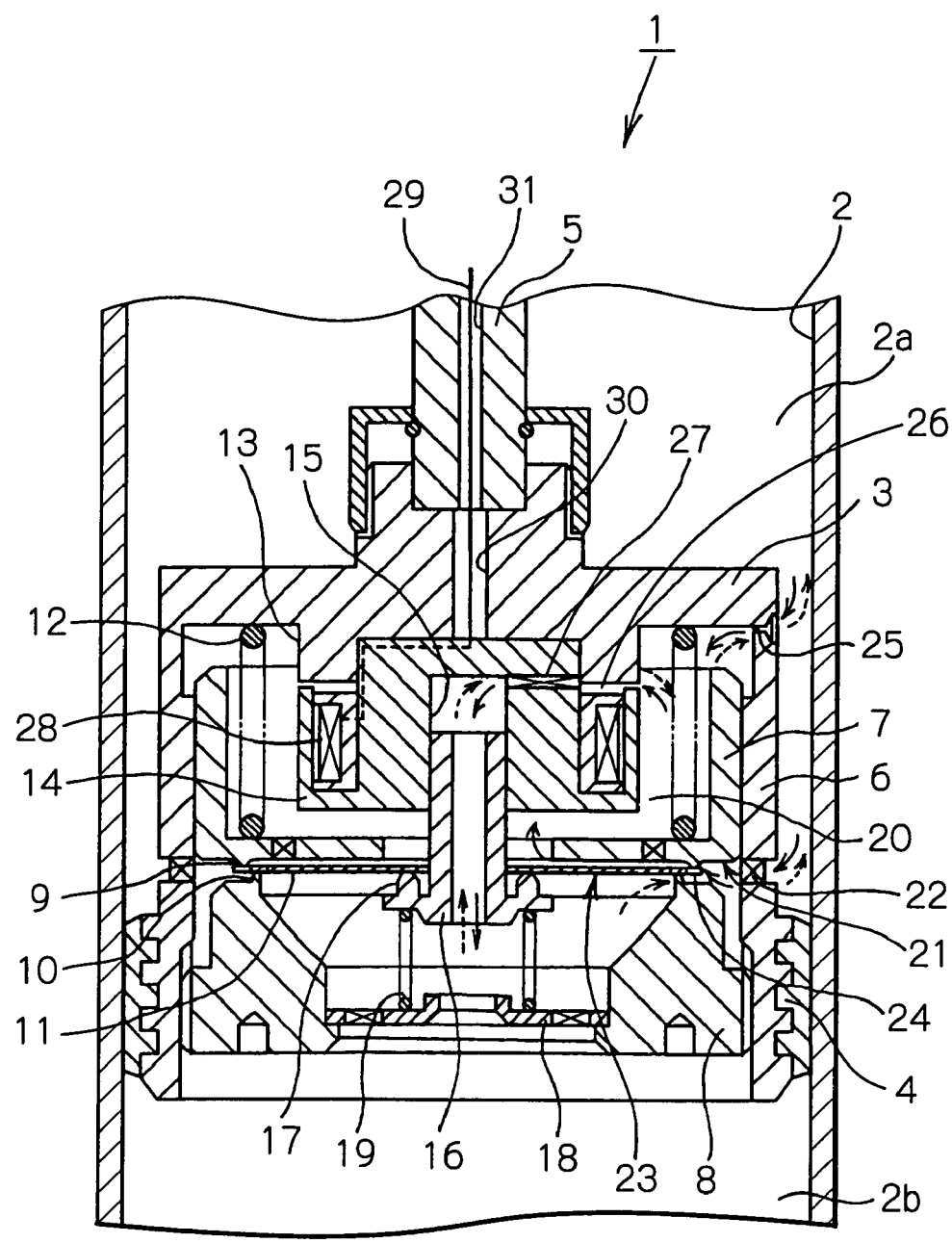
FIG. 1 is a vertical sectional view of an essential part of a controllable damping force shock absorber according to a first embodiment of the present invention.

First, a first embodiment is described, referring to FIG. 1. As indicated in FIG. 1, a controllable damping force shock absorber 1 according to this embodiment comprises a cylinder 2, in which a generally cylindrical piston member 3 having one end closed is slidably disposed in a fitted relationship (the piston member 3, including a piston seal 4 described later, forms a piston). A piston seal 4 is provided on a side of an open end of the piston member 3. An inside of the cylinder 2 is divided into an upper cylinder chamber 2a and a lower cylinder chamber 2b by the piston seal 4. One end of a piston rod 5 having a hollow structure is connected to a bottom portion of the piston member 3, and the other end of the piston rod 5 is extended to the outside through a rod guide (not shown) and an oil seal (not shown) provided at an end portion of the cylinder 2.

A magnetic fluid (an example of a variable viscosity fluid) is sealably contained in the cylinder 2. The magnetic fluid is a fluid having viscosity varied due to the action of a magnetic field, such as a composite material composed of ferromagnetic ultra-fine particles uniformly and stably dispersed within a liquid medium. As the strength of a magnetic field to which the magnetic fluid is exposed is increased, the viscosity of the magnetic fluid is also increased. The cylinder 2 is connected to a reservoir (not shown) in which the magnetic fluid and a gas are sealably contained. A voluminal change in the cylinder 2 corresponding to the volume of the portion of the piston rod 5 that enters or retracts from the cylinder 2 is compensated for by compression and expansion of the gas.

A generally cylindrical movable member 7 having one end closed is slidably disposed in a cylindrical portion 6 of the piston member 3 in a fitted relationship. An annular main valve member 8 is threadably fixed to an open end portion of the piston member 3. A disc valve 11 is interposed between an annular seat portion 9 which projects from a bottom portion of the movable member 7 and an annular seat portion 10 which projects from the main valve member 8. The movable member 7 and the disc valve 11 in combination form a damping valve in the present invention. The movable member 7 and the disc valve 11 are biased toward the seat portion 10 under force of a spring 12.

A generally cylindrical coil case 14 is fittingly disposed and fixed in a cylindrical portion 13 which projects from the bottom portion of the piston member 3. One end portion of a cylindrical slide member 16 is slidably disposed in a guide bore 15 formed at a central portion of the coil case 14, and the other end portion of the slide member 16 extends through the disc valve 11, thereby radially positioning the disc valve 11. A seat portion 17 is formed at an outer peripheral portion of the other end portion of the slide member 16. A spring 19 is interposed between the slide member 16 and a spring bearing 18 attached to the main valve member 8. The spring 19 applies a force to the slide member 16 in a direction such that the seat portion 17 presses a central portion of the disc valve 11, so that the disc valve 11 is always pressed against the seat portion 9 of the movable member 7.

A pilot chamber 20 (a damping force-controlling mechanism) is formed in the cylindrical portion 6 of the piston member 3, which is defined by the movable member 7, the disc valve 11, the coil case 14 and the slide member 16. The bottom portion of the movable member 7 and the disc valve 11 annularly form, at a position outward of the seat portion 10, an extension-stroke pressure-receiving portion 21. A passage 22 is provided in the cylindrical portion 6 of the piston member 3 at a position facing the extension-stroke pressure-receiving portion 21. The passage 22 is communicated with the upper cylinder chamber 2a. The disc valve 11 forms, at a position inward of the seat portion 10, an annularly-shaped compression-stroke pressure-receiving portion 23 facing the lower cylinder chamber 2b. The disc valve 11 opens when separated from the seat portion 10, due to the action of a pressure in the upper cylinder chamber 2a, which is received by the extension-stroke pressure-receiving portion 21, or the action of a pressure in the lower cylinder chamber 2b, which is received by the compression-stroke pressure-receiving portion 23. When the disc valve 11 is open, the upper cylinder chamber 2a and the lower cylinder chamber 2b are communicated with each other, and a pressure in the pilot chamber 20 acts in a direction for closing the disc valve 11.

The pilot chamber 20 is communicated with the passage 22 through fixed orifices 24 (cut portions) formed at an outer peripheral portion of the disc valve 11. The pilot chamber 20 is also communicated with the upper cylinder chamber 2a through a fixed orifice 25 formed in the cylindrical portion 6 of the piston member 3. The fixed orifice 25, which is located at the uppermost position in the pilot chamber 20, also serves as an air release passage.

A passage 26 is formed between a forward end of the cylindrical portion 13 of the piston member 3 and an end face of an outer peripheral portion of the coil case 14, and a passage 27 is formed in a side wall of the coil case 14. The pilot chamber 20 is communicated with the guide bore 15 through the passage 26 and the passage 27, and further communicated with the lower cylinder chamber 2b through an interior of the slide member 16 fittingly disposed in the guide bore 15. The fixed orifices 24 and 25, the passage 26, the passage 27, the guide bore 15 and the interior of the slide member 16 in combination form a pilot passage (a damping force-controlling mechanism) for allowing the magnetic fluid to flow through the pilot chamber 20 according to slidable movement of the piston member 3.

The coil case 14 accommodates a coil 28 (a damping force-controlling mechanism, viscosity-changing means) located adjacent to the passage 26. Portions surrounding the passages 26 and 27 and the coil 28 are formed from a magnetic body, so that a magnetic field generated by the coil 28 acts on the magnetic fluid flowing through the passages 26 and 27. A conductor 29 of the coil 28 extends from the coil case 14 through a bore 30 formed in the piston member 3 and a bore 31 in the piston rod 5, and further extends beyond a forward end of the piston rod 5 to the outside, and is connected to a controller (not shown).

Next, an operation of the above embodiment is explained.

A flow of the magnetic fluid in an extension stroke of the piston rod 5 is indicated by solid arrows in FIG. 1. Before the disc valve 11 opens, the magnetic fluid in the upper cylinder chamber 2a passes through the passage 22 and the fixed orifices 24, and through the fixed orifice 25, and flows into the pilot chamber 20. The magnetic fluid further flows from the pilot chamber 20 into the lower cylinder chamber 2b through the passages 26 and 27, the guide bore 15 and the interior of the slide member 16. When the pressure in the upper cylinder chamber 2a acting on the extension-stroke pressure-receiving portion 21 of the disc valve 11 reaches a valve-opening pressure of the disc valve 11, the disc valve 11 opens, and the magnetic fluid in the upper cylinder chamber 2a directly flows from the passage 22 into the lower cylinder chamber 2b.

A flow of the magnetic fluid in a compression stroke of the piston rod 5 is indicated by dashed arrows in FIG. 1. Before the disc valve 11 opens, the magnetic fluid in the lower cylinder chamber 2b passes through the interior of the slide member 16, the guide bore 15 and the passages 27 and 26 and flows into the pilot chamber 20. The magnetic fluid further flows from the pilot chamber 20 into the upper cylinder chamber 2a through the fixed orifices 24 and the passage 22, and through the fixed orifice 25. When the pressure in the lower cylinder chamber 2b acting on the compression-stroke pressure-receiving portion 23 of the disc valve 11 reaches the valve-opening pressure, the disc valve 11 opens, and the magnetic fluid in the lower cylinder chamber 2b directly flows from the passage 22 into the upper cylinder chamber 2a.

A damping force can be controlled by changing the viscosity of the magnetic fluid flowing through the passages 26 and 27, according to a controlled current applied from the controller to the coil 28.

When the coil 28 is de-energized, the viscosity of the magnetic fluid is low, and the flow resistance of the passages 26 and 27 is smaller than the flow resistance of the fixed orifices 24 and 25. In this case, in an extension stroke, the flow resistance of the passages 26 and 27 located on the downstream side of the pilot chamber 20 is smaller than that of the fixed orifices 24 and 25 located on the upstream side of the pilot chamber 20. Therefore, the pressure in the pilot chamber 20 is low, and therefore the valve-opening pressure of the disc valve 11 is low. Consequently, a small damping force is generated in the extension stroke (soft damping for an extension stroke). In a compression stroke, the flow resistance of the passages 26 and 27 located on the upstream side of the pilot chamber 20 is smaller than that of the fixed orifices 24 and 25 located on the downstream side of the pilot chamber 20. Therefore, the pressure in the pilot chamber 20 becomes high, and therefore the valve-opening pressure of the disc valve 11 becomes high. Consequently, a large damping force is generated (hard damping for a compression stroke).

When the coil 28 is energized for excitation, a magnetic field generated by the coil 28 acts on the magnetic fluid flowing through the passages 26 and 27, thus increasing the viscosity of the magnetic fluid and making the flow resistance of the passages 26 and 27 larger than that of the fixed orifices 24 and 25. In this case, in an extension stroke, the flow resistance of the passages 26 and 27 located on the downstream side of the pilot chamber 20 is larger than that of the fixed orifices 24 and 25 located on the upstream side of the pilot chamber 20. Therefore, the pressure in the pilot chamber 20 becomes high, and therefore the valve-opening pressure of the disc valve 11 becomes high. Consequently, a large damping force is generated in the extension stroke (hard damping for an extension stroke). In a compression stroke, the flow resistance of the passages 26 and 27 on the upstream side of the pilot chamber 20 is larger than that of the fixed orifices 24 and 25 on the downstream side of the pilot chamber 20. Therefore, the pressure in the pilot chamber 20 becomes low, and therefore the valve-opening pressure of the disc valve 11 becomes low. Consequently, a small damping force is generated (soft damping for a compression stroke).

Thus, a damping force can be controlled according to a current applied to the coil 28. Reverse damping force characteristics for an extension stroke and a compression stroke can be obtained, such that when hard damping is provided in one of an extension stroke and a compression stroke, soft damping is provided in the other stroke. This achieves high responsiveness when a damping force is controlled, based on the "sky-hook" theory.

In this embodiment, a damping force for an extension stroke and a compression stroke is controlled by changing the pressure in the pilot chamber 20 according to the flow resistance of the passages 26 and 27. Therefore, the magnetic fluid which is exposed to the magnetic field can be flowed at a low flow rate. Therefore, the shock absorber can be operated with low power consumption over a sufficiently wide range of controlled damping force. Further, it is unnecessary to increase the viscosity of the magnetic fluid to an excessively high level, so there are no problems such as instability of a state of dispersion of the magnetic fluid or deterioration of seal members in the shock absorber. Further, a coil having a small capacity can be used, so that the coil 28 can be compact in size. In addition, for obtaining reverse damping force characteristics, a damping force for an extension stroke and a compression stroke can be controlled using only one disc valve 11 and one pilot chamber 20. Therefore, a shock absorber which has a simple structure and is compact in size can be obtained.

Next, a second embodiment of the present invention is described, referring to FIGS. 2 to 7. A structure of a controllable damping force shock absorber of the second embodiment is substantially the same as that of the first embodiment, except that the coil and the passages for communication between the pilot chamber 20 and the upper and lower cylinder chambers 2a and 2b are changed. Therefore, the same parts or portions as used in the first embodiment are indicated by the same reference numerals, and overlapping explanations are omitted.

In a controllable damping force shock absorber 32 in the second embodiment, a coil case 35 accommodating two coils 33 and 34 (a damping force-controlling mechanism) is attached to the bottom portion of the piston member 3. The coil case 35 is fixed by a generally cylindrical fixing member 36 threadably attached to the bottom portion of the piston member 3.

The pilot chamber 20 is communicated with the upper cylinder chamber 2a through an orifice passage 37 formed in a side wall of the fixing member 36, a passage 38 formed between the fixing member 36 and the coil case 35 and a passage 39 formed in the bottom portion of the piston member 3. The pilot chamber 20 is also communicated with the lower cylinder chamber 2b through a passage 40 formed in the side wall of the fixing member 36, an orifice passage 41 formed in the coil case 35, the guide bore 15 and the interior of the slide member 16. The orifice passage 37, the passages 38, 39 and 40, the orifice passage 41, the guide bore 15 and the interior of the slide member 16 in combination form a pilot passage (a damping force-controlling mechanism) for allowing the magnetic fluid to flow through the pilot chamber 20 according to slidable movement of the piston member 3.

The coil 33 is located adjacent to the orifice passage 37 and the passage 38. Portions surrounding the coil 33, the orifice passage 37 and the passage 38 are formed from a magnetic body, so that the viscosity of the magnetic fluid flowing through the orifice passage 37 changes due to the action of a magnetic field generated by the coil 33. The coil 34 is located adjacent to the passage 40 and the orifice passage 41. Portions surrounding the coil 34, the passage 40 and the orifice passage 41 are formed from a magnetic body, so that the viscosity of the magnetic fluid flowing through the orifice passage 41 changes due to the action of a magnetic field generated by the coil 34. Conductors 42 and 43 of the coils 33 and 34 extend from the coil case 35 through the bore 30 in the piston member 3 and the bore 31 in the piston rod 5, and further extend beyond the forward end of the piston rod 5 to the outside, and are connected to the controller (not shown).

Next, an operation of the second embodiment is explained.

Figure 2:
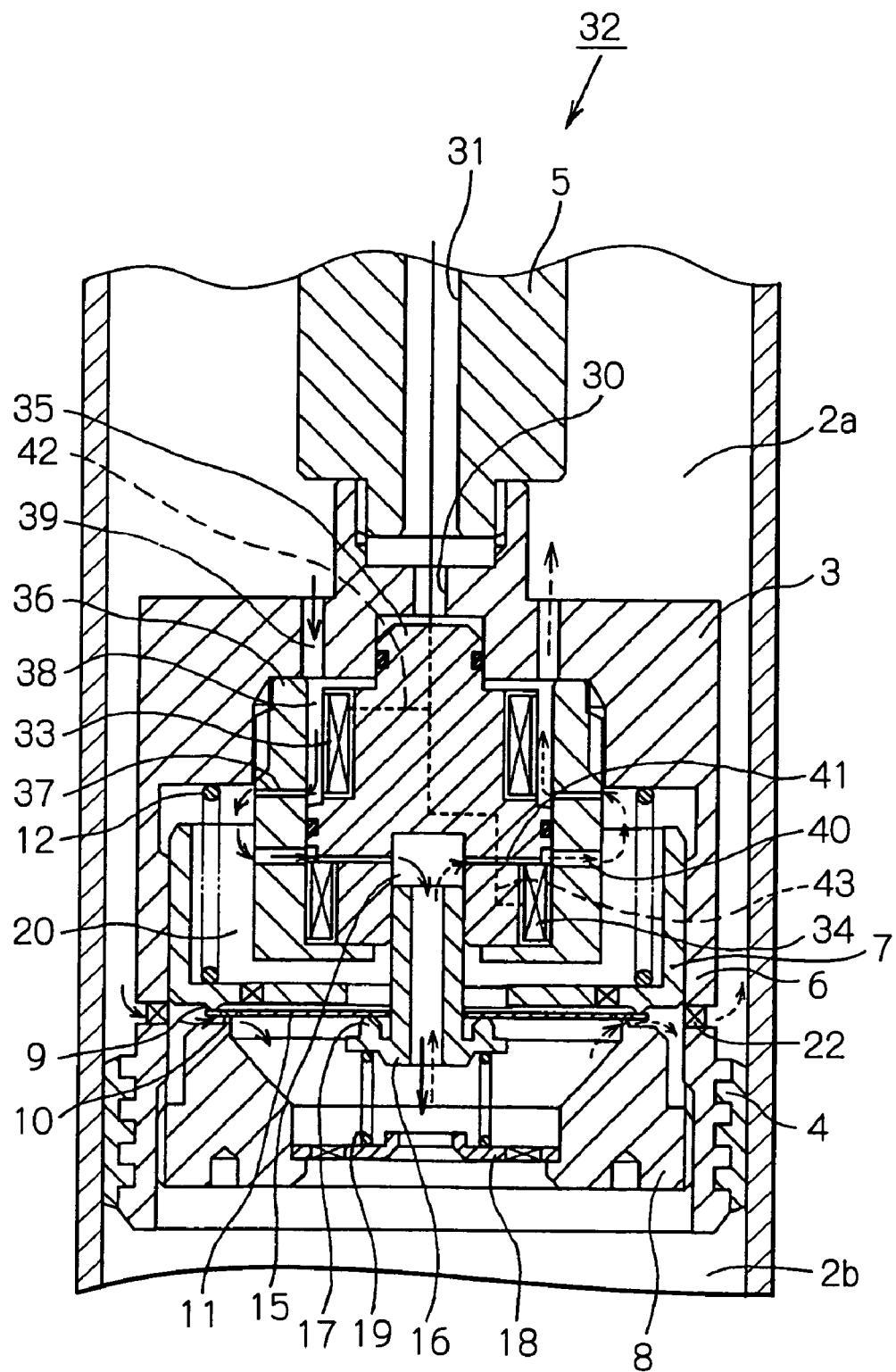
FIG. 2 is a vertical sectional view of an essential part of a controllable damping force shock absorber according to a second embodiment of the present invention.

A flow of the magnetic fluid in an extension stroke of the piston rod 5 is indicated by solid arrows in FIG. 2. Before the disc valve 11 opens, the magnetic fluid in the upper cylinder chamber 2a passes through the passage 39, the passage 38 and the orifice passage 37 and flows into the pilot chamber 20. The magnetic fluid further flows from the pilot chamber 20 into the lower cylinder chamber 2b through the passage 40, the orifice passage 41, the guide bore 15 and the interior of the slide member 16. When the pressure in the upper cylinder chamber 2a acting on the extension-stroke pressure-receiving portion 21 of the disc valve 11 reaches the valve-opening pressure of the disc valve 11, the disc valve 11 opens, and the magnetic fluid in the upper cylinder chamber 2a directly flows from the passage 22 into the lower cylinder chamber 2b.

A flow of the magnetic fluid in a compression stroke of the piston rod 5 is indicated by dashed arrows in FIG. 2. Before the disc valve 11 opens, the magnetic fluid in the lower cylinder chamber 2b passes through the interior of the slide member 16, the guide bore 15, the orifice passage 41 and the passage 40 and flows into the pilot chamber 20. The magnetic fluid further flows from the pilot chamber 20 into the upper cylinder chamber 2a through the fixed orifice passage 37, the passage 38 and the passage 39. When the pressure in the lower cylinder chamber 2b acting on the compression-stroke pressure-receiving portion 23 of the disc valve 11 reaches the valve-opening pressure, the disc valve 11 opens, and the magnetic fluid in the lower cylinder chamber 2b directly flows from the passage 22 into the upper cylinder chamber 2a.

Figure 3:
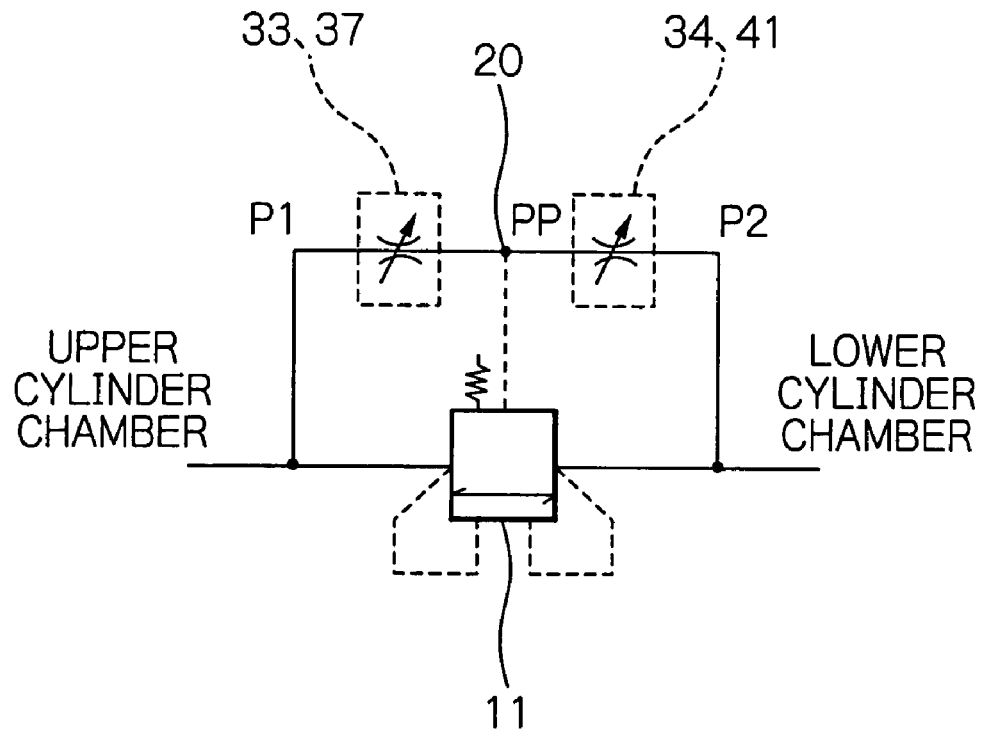
FIG. 3 is a fluid circuit diagram of the shock absorber of FIG. 2.

A damping force can be controlled by changing the viscosity of the magnetic fluid flowing through the orifice passages 37 and 41, according to control currents applied from the controller to the coils 33 and 34. In this embodiment, the pressure in the pilot chamber 20 for controlling the valve-opening pressure of the disc valve 11 is determined based on a flow resistance ratio varied by changing the viscosity of the magnetic fluid flowing through the orifice passage on the upstream side of the pilot chamber 20 (the orifice passage 37 or 41) and the orifice passage on the downstream side of the pilot chamber 20 (the orifice passage 41 or 37). FIG. 3 is a fluid circuit diagram of the damping force-controlling mechanism.

Figure 4:
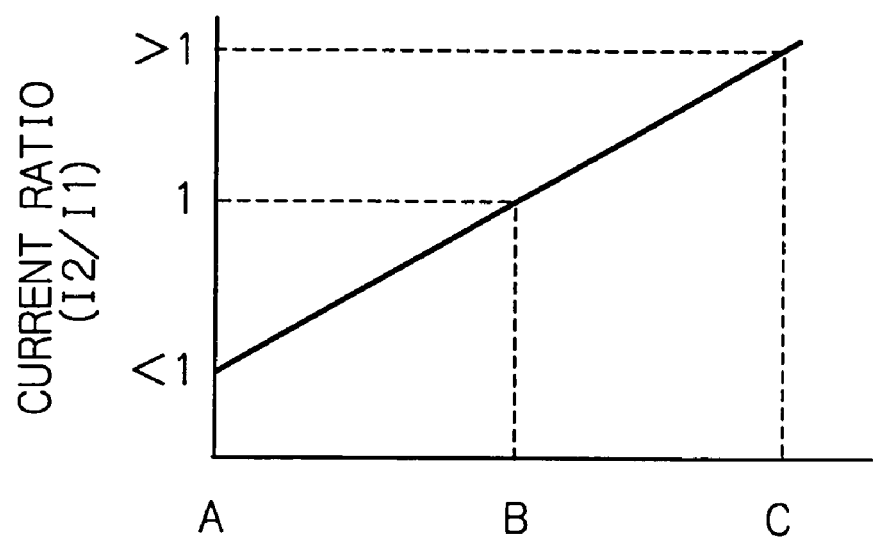
FIG. 4 is a graph indicating an example of a ratio between the currents applied to two coils in the shock absorber shown in FIG. 2.
Figure 5:
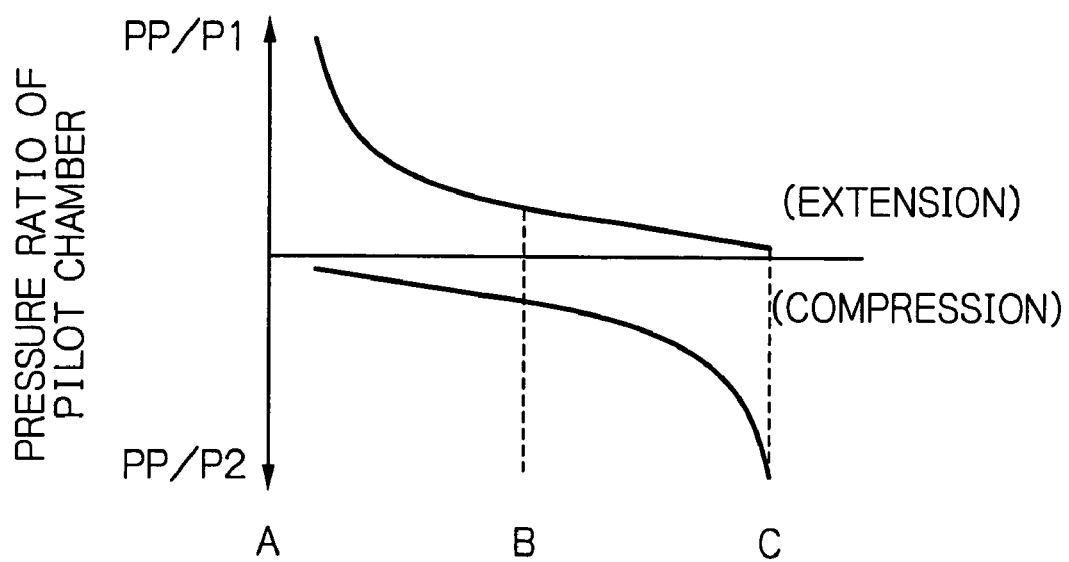
FIG. 5 is a graph indicating a relationship between a ratio of a pressure in a pilot chamber to a pressure in each of upper and lower cylinder chambers and the ratio, indicated in FIG. 4, between the currents applied to the coils in the shock absorber of FIG. 2.

FIG. 4 indicates how a ratio (I2/I1) between a current I1 applied to the coil 34 and a current I2 applied to the coil 33 is changed, by way of example. By changing the value of I2/I1 as indicated in FIG. 4, starting with a region A (I2/I1<1) and following through a region B (I2/I1=1) and a region C (I2/I1>1), a ratio (PP/P1) of a pressure PP in the pilot chamber 20 to a pressure P1 in the upper cylinder chamber 2a, and a ratio (PP/P2) of the pressure PP to a pressure P2 in the lower cylinder chamber 2b, are controlled as indicated in FIG. 5. In FIG. 5, the domain above the horizontal axis shows the relevant relationship in an extension stroke and the domain below the horizontal axis shows the relevant relationship in a compression stroke.

That is, in the region A (I2/I1<1), in an extension stroke, the flow resistance of the orifice passage 37 on the upstream side of the pilot chamber 20 is small and the flow resistance of the orifice passage 41 on the downstream side of the pilot chamber 20 is large. Therefore, the pressure in the pilot chamber 20 is high, so that the valve-opening pressure of the disc valve 11 is high, thus generating a large damping force for the extension stroke (hard damping for an extension stroke). In this case, in a compression stroke, the flow resistance of the orifice passage 41 on the upstream side of the pilot chamber 20 is large and the flow resistance of the orifice passage 37 on the downstream side of the pilot chamber 20 is small. Therefore, the pressure in the pilot chamber 20 becomes low, so that the valve-opening pressure of the disc valve 11 becomes low, thus generating a small damping force for the compression stroke (soft damping for a compression stroke).

In the region C (I2/I1>1), in an extension stroke, the flow resistance of the orifice passage 37 on the upstream side of the pilot chamber 20 is large and the flow resistance of the orifice passage 41 on the downstream side of the pilot chamber 20 is small. Therefore, the pressure in the pilot chamber 20 is low, so that the valve-opening pressure of the disc valve 11 is low, thus generating a small damping force for the extension stroke (soft damping for an extension stroke). In this case, in a compression stroke, the flow resistance of the orifice passage 41 on the upstream side of the pilot chamber 20 is small and the flow resistance of the orifice passage 37 on the downstream side of the pilot chamber 20 is large. Therefore, the pressure in the pilot chamber 20 becomes high, so that the valve-opening pressure of the disc valve 11 becomes high, thus generating a large damping force for the compression stroke (hard damping for a compression stroke). In the region B (I2/I1=1), a damping force becomes intermediate.

Figure 6:
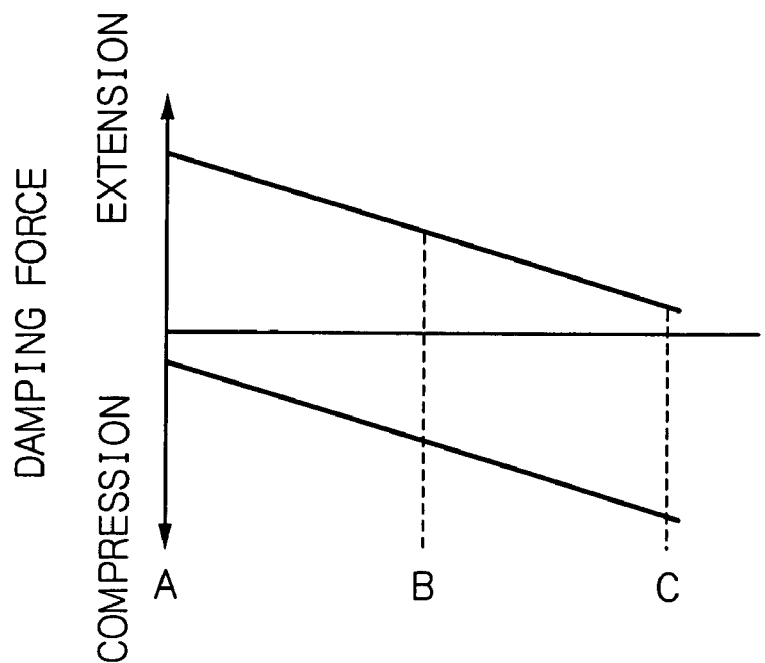
FIG. 6 is a graph indicating a relationship between a damping force and the ratio, indicated in FIG. 4, between the currents applied to the coils in the shock absorber of FIG. 2.

Thus, by controlling the currents applied to the coils 33 and 34, reverse damping force characteristics for an extension stroke and a compression stroke can be obtained as indicated in FIG. 6, such that when hard damping is provided in one of the extension stroke and the compression stroke, soft damping is provided in the other stroke. This achieves high responsiveness when a damping force is controlled, based on the "sky-hook" theory. Various damping force characteristics other than reverse damping force characteristics can also be obtained by using an appropriate combination of the currents applied to the two coils 33 and 34. For example, hard damping can be provided in both the extension stroke and the compression stroke, or an intermediate damping force (having characteristics between hard damping and soft damping) can be generated in both the extension stroke and the compression stroke.

Figure 7:
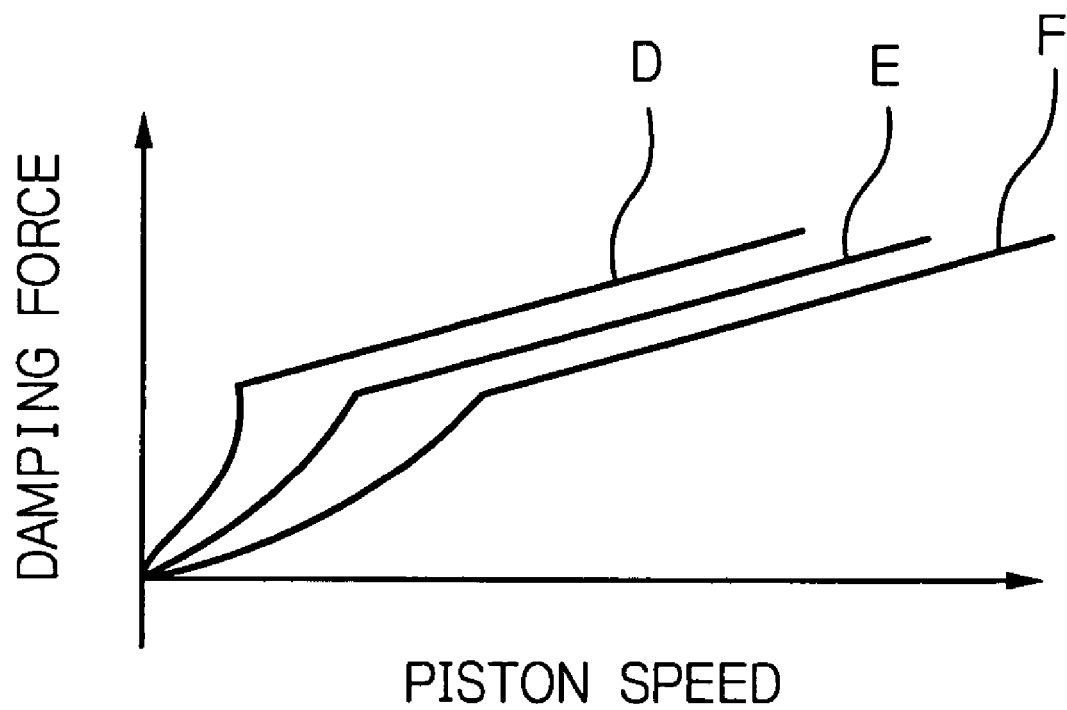
FIG. 7 is a graph indicating damping force characteristics in a low-speed range of piston speeds of the shock absorber of FIG. 2.

Since two coils 33 and 34 are provided, the flow resistance of the orifice passage on the upstream side of the pilot chamber 20 (the orifice passage 37 in the extension stroke, the orifice passage 41 in the compression stroke) can be appropriately controlled by controlling the currents applied to these coils 33 and 34. Therefore, as indicated in FIG. 7, in both the extension stroke and the compression stroke, a damping force in a low-speed range of piston speeds (orifice characteristics) can be controlled in such a manner as indicated by a line D (high flow resistance on the upstream side of the pilot chamber 20), E (intermediate flow resistance on the upstream side of the pilot chamber 20) or F (low flow resistance on the upstream side of the pilot chamber 20). Thus, a damping force can be controlled with a high degree of flexibility.

Further, when a damping force is switched from hard damping to soft damping, the pressure in the pilot chamber 20 can be rapidly released by de-energizing the coil (the coil 34 in the extension stroke, and the coil 33 in the compression stroke) in the orifice passage on the downstream side of the pilot chamber 20 (the orifice passage 41 in the extension stroke, and the orifice passage 37 in the compression stroke). This achieves high responsiveness when switching a damping force.

Figure 8:
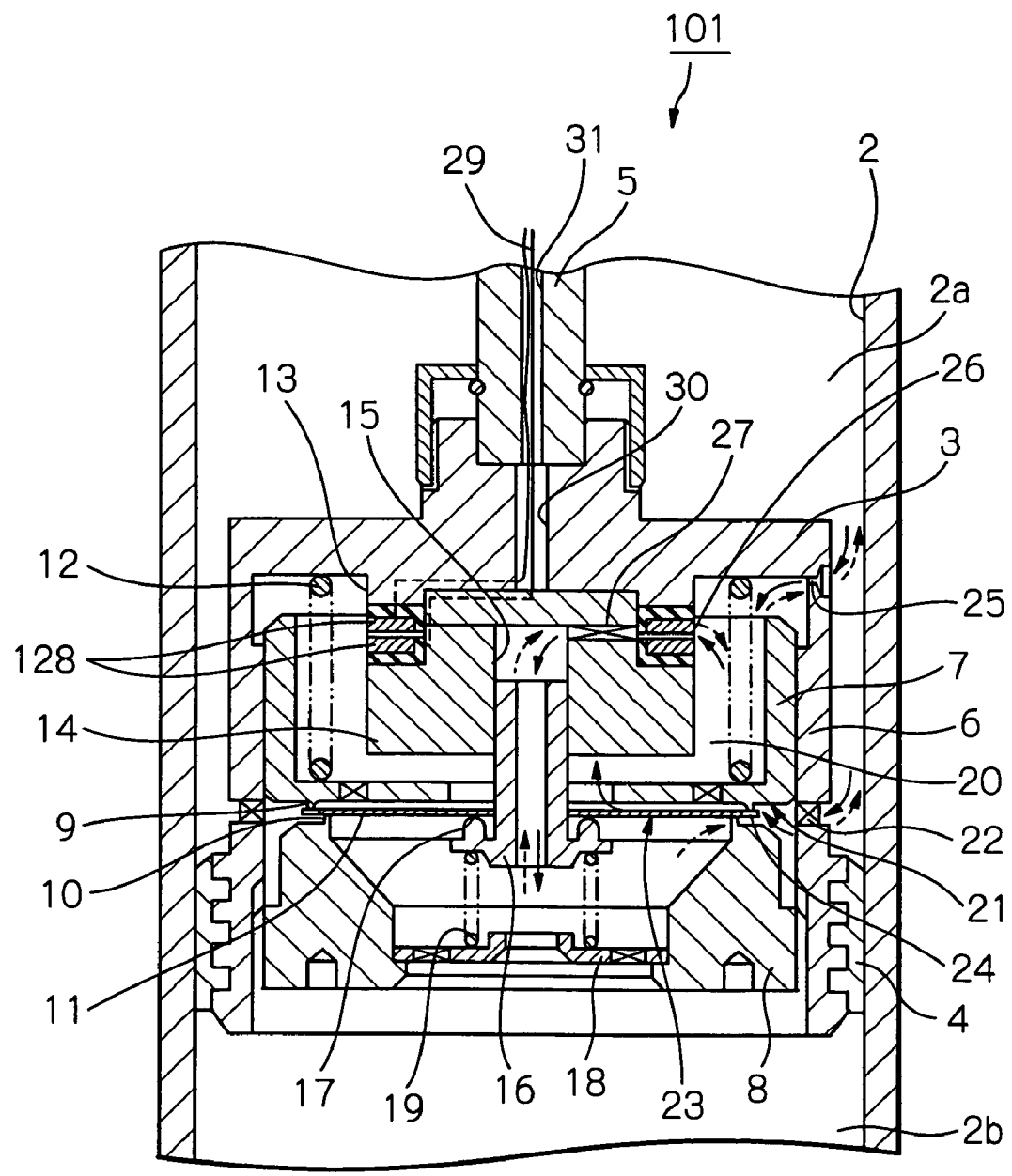
FIG. 8 is a vertical sectional view of an essential part of a controllable damping force shock absorber according to a third embodiment of the present invention.

Next, referring to FIG. 8, a third embodiment of the present invention is described. The third embodiment is substantially the same as the first embodiment, except that instead of the magnetic fluid, an electrorheological fluid having viscosity varied due to the action of an electric field is sealably contained in the cylinder 2, and that a pair of electrodes 128 is provided on opposite sides of the passage 26, instead of providing the coil 28. Therefore, the same parts or portions as used in the first embodiment are indicated by the same reference numerals, and overlapping explanations are omitted.

As indicated in FIG. 8, a controllable damping force shock absorber 101 in this embodiment has no coil 28 such as that provided in the first embodiment. Instead, a pair of electrodes 128 is provided in the coil case 14 and the cylindrical portion 13 through insulating materials so that the passage 26 is interposed between the electrodes 128. The pair of electrodes 128 (viscosity-changing means) is adapted to generate an electric field in the passage 26 when energized.

In the first embodiment, a magnetic fluid is sealably contained in the cylinder 2 of the controllable damping force shock absorber 1. In the third embodiment, an electrorheological fluid (a variable viscosity fluid) is sealably contained in the cylinder 2 of the controllable damping force shock absorber 101. The electrorheological fluid is a fluid having viscosity varied due to the action of an electric field.

In the third embodiment, an electric field is generated in the passage 26 by energizing the electrodes 128. Due to the action of this electric field, the viscosity of the electrorheological fluid passing through the passage 26 changes, thus changing the flow resistance of the passage 26. Therefore, the pressure in the pilot chamber 20 can be increased or decreased by controlling a current applied to the electrodes 128, thus controlling a damping force generated by the controllable damping force shock absorber 101.

What is claimed is:

1. A controllable damping force shock absorber comprising:
   a cylinder in which a variable viscosity fluid is sealably contained;
   a piston slidably disposed in the cylinder in a fitted relationship so as to divide the interior of the cylinder into two cylinder chambers;
   a piston rod having one end connected to the piston and the other end extended to the outside of the cylinder; and
   a damping force-controlling mechanism for generating a controlled damping force by controlling a flow of the variable viscosity fluid caused by slidable movement of the piston,
   the damping force-controlling mechanism including:
   a damping valve having a pressure-receiving portion for receiving a pressure of the variable viscosity fluid in at least one of an extension stroke and a compression stroke of the piston rod,
   a pilot chamber provided behind the pressure-receiving portion, wherein a pressure in the pilot chamber is applied in a direction for closing the damping valve so that the pilot chamber controls the opening of the damping valve and when the damping valve is opened, the variable viscosity fluid is allowed to flow from one of the cylinder chambers to the other without passing through the pilot chamber;
   a pilot passage for allowing the variable viscosity fluid to flow through the pilot chamber according to slidable movement of the piston; and
   viscosity-changing means adapted to change viscosity of the variable viscosity fluid flowing through the pilot passage so that the pressure in the pilot chamber varies depending on the change in the viscosity of the variable viscosity fluid.

2. A controllable damping force shock absorber according to claim 1, wherein the pressure-receiving portion includes an extension-stroke pressure-receiving portion for receiving the pressure of the variable viscosity fluid in the extension stroke of the piston rod and a compression-stroke pressure-receiving portion for receiving the pressure of the variable viscosity fluid in the compression stroke of the piston rod.

3. A controllable damping force shock absorber according to claim 1, wherein the variable viscosity fluid is a magnetic fluid and the viscosity-changing means comprises a coil which generates a magnetic field acting on the magnetic fluid flowing through the pilot passage.

4. A controllable damping force shock absorber according to claim 2, wherein the variable viscosity fluid is a magnetic fluid and the viscosity-changing means comprises a coil which generates a magnetic field acting on the magnetic fluid flowing through the pilot passage.

5. A controllable damping force shock absorber according to claim 2, wherein the viscosity-changing means has portions provided in the pilot passage on opposite sides of the pilot chamber.

6. A controllable damping force shock absorber according to claim 2, wherein the damping force-controlling mechanism provides reverse damping force characteristics in which when soft damping is generated in one of the extension stroke and the compression stroke, hard damping is generated in the other stroke.

7. A controllable damping force shock absorber according to claim 2, wherein the damping force-controlling mechanism includes a single damping valve and a single pilot chamber.

8. A controllable damping force shock absorber according to claim 1, wherein the variable viscosity fluid is an electrorheological fluid and the viscosity-changing means comprises electrodes which generate an electric field acting on the electrorheological fluid flowing through the pilot passage.

9. A controllable damping force shock absorber according to claim 2, wherein the variable viscosity fluid is an electrorheological fluid and the viscosity-changing means comprises electrodes which generate an electric field acting on the electrorheological fluid flowing through the pilot passage.

* * * * *